Aug. 11, 1936.  H. R. SIEVERKROPP  2,050,739
LAWN CULTIVATOR
Filed March 9, 1935
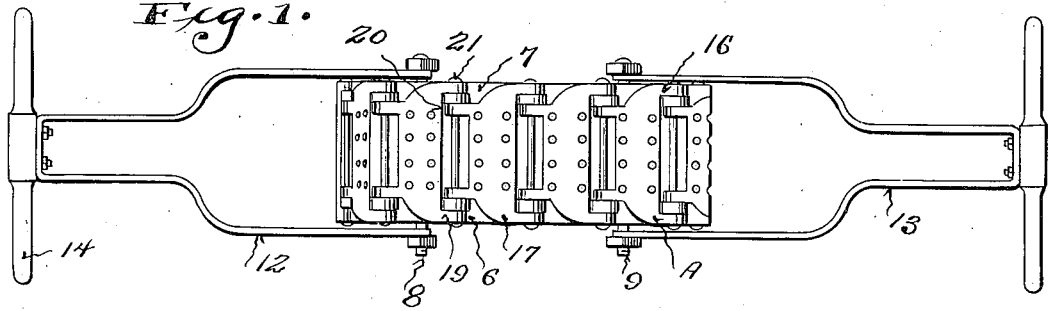
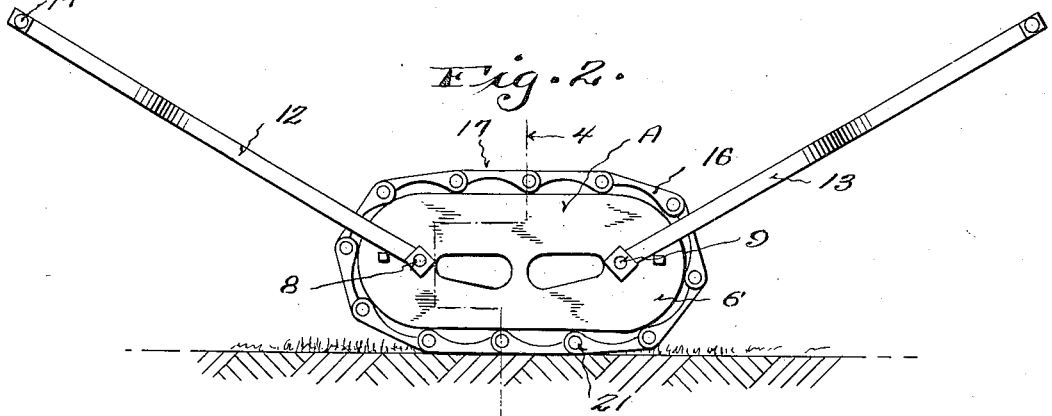
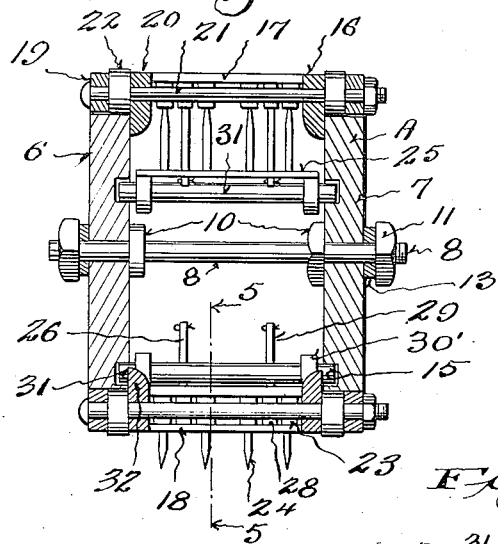
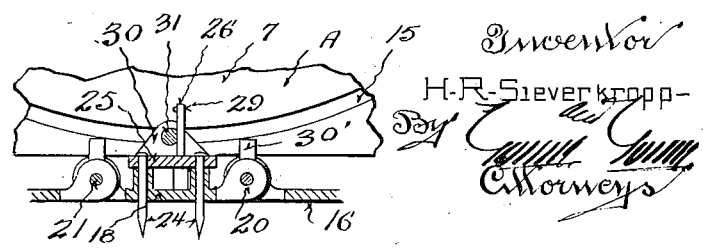
Inventor
H. R. Sieverkropp
By
Attorneys Patented Aug. 11, 1936

2,050,739

UNITED STATES PATENT OFFICE 2,050,739

LAWN CULTIVATOR

Henry R. Sieverkropp, Racine, Wis.

Application March 9, 1935, Serial No. 10,157

4 Claims. (Cl. 97—52)

This invention appertains to lawn cultivators, and more particularly to a mobile machine especially susceptible for use on wide stretches of lawn, such as found on golf courses and the like.

It has been found that a crust, or mat, forms on the earth around the grass, which prevents the desired moisture and air from reaching the roots. In some instances spiked rollers have been employed, and while the spikes break through the crust, or mat, the same tend to break and tear up the turf incident to the travel of the roller thereover.

Therefore, it is one of the salient objects of my invention to provide a lawn cultivator in which the spikes, or pins, employed for the purpose of permitting air and moisture to reach the roots, are so operated that the tearing and uprooting of the turf is prevented.

Another important object of my invention is the provision of novel means for moving the spikes vertically incident to the forcing of the same into and out of the turf, so that the spikes will not act as teeth to tear or mutilate the lawn.

A further object of my invention is the provision of novel means for holding the turf during the forcing of the spikes in the ground, and during the removal of the spikes from the ground, whereby the turf is prevented from being torn away from the ground, and whereby the turf will be left in its original condition other than the forming of the air and moisture openings therein.

A still further object of my invention is to provide a lawn cultivator of the above character, which will be durable and efficient in use, one that will be simple and easy to manufacture, and one which can be placed upon the market at a reasonable cost.

With these and other objects in view, the invention consists in the novel construction, arrangement and formation of parts, as will be hereinafter more specifically described, claimed and illustrated in the accompanying drawing, in which drawing:—

Figure 1 is a top plan view of my improved lawn cultivator.

Figure 2 is a side elevation of the same.

Figure 3 is an inner side elevation of one of the main frame plates showing the novel cam track formed therein.

Figure 4 is a transverse section through the improved cultivator, taken on the line 4—4 of Figure 2 looking in the direction of the arrows, the view being taken on an enlarged scale.

Figure 5 is a detail, fragmentary longitudinal section through the improved cultivator, taken on the line 5—5 of Figure 4.

Referring to the drawing in detail, wherein similar reference characters designate corresponding parts through the several views, the letter A generally indicates my improved lawn cultivator, which comprises a pair of like side frame plates 6 and 7.

These frame plates 6 and 7 can be in the nature of castings, and are of a substantially oval shape in side elevation. The frame plates 6 and 7 are held in their proper spaced relation by means of bolts 8 and 9 located adjacent to the opposite ends of the machine. The bolts have formed thereon or secured thereto stops 10, against which the inner faces of the frame plates abut. The frame plates can be held against the stops by means of nuts, or the like, 11. The bolts also form means for receiving the oppositely extending handles 12 and 13, by means of which the cultivator is pushed over the ground. Any preferred type of hand grips 14 can be provided for the handles 12 and 13.

The inner faces of the frame plates 6 and 7 have formed therein a cam track, or guide groove, 15. By referring to Figures 3 and 4, it will be noticed that the cam track 15 is equidistantly spaced at all points from the top and end edges of the side plates, but gradually approaches the bottom edges of the frame plates at the transverse center thereof.

Mounted upon the frame plates for traveling movement is an endless track 16. This endless track 16 includes a plurality of pivotally connected links, or shoes, 17, which form an important part of my invention.

Each of the links, or shoes, 17 includes a flat plate 18 having outer pivot ears 19 formed on one side, and inner pivot ears 20 formed on the other side. The inner pivot ears 20 are received between the outer pivot ears 19 of an adjacent link, or shoe, and a pivot bolt 21 is employed for connecting the inner and outer pivot ears of the adjacent links together.

If preferred, anti-friction rollers 22 can be rotatably mounted on the pivot bolts 21 between the inner and outer ears 19 and 20. These rollers are adapted to engage the outer, or peripheral, edges of the frame plates to facilitate the travel of the endless track thereabout.

The inner faces of each of the plates 18 of the shoes 17 have formed thereon a plurality of guide sleeves 23, through which slidably extend the ground penetrating spikes 24. Obviously, the plates 18 have openings therein alined with the guide sleeves to receive the spikes. The spikes are firmly anchored to operating plates 25 slidably mounted on the shoes, or links, 17.

In the present instance, I have shown guide rods 26 rigidly anchored to bosses 28 formed on the inner faces of the plates 18 of the shoes, and these guide rods extend through guide openings formed in the operating plates 25. Cotter pins 29, or the like, can be utilized for limiting the inward sliding movement of the operator plates on the guide rods.

The opposite ends of the operating plates 25 have formed thereon lugs 30, through which extends a cross shaft 31. The ends of all of the cross shafts are fitted within the cam track 15, and, if preferred, the ends of the shafts can carry anti-friction rollers for engaging the walls of the cam track.

In operation of my improved cultivator, the same is pushed over the lawn and the endless track travels around the frame plates. As the endless track moves about the frame plates, the cross shafts 31 travel in the cam tracks 15, and consequently when the shafts reach the bottom portion of the track the operating plates 25 will be forced downwardly toward the ground, moving the spikes 24 into the ground with a vertical movement.

As the cross shafts travel up the cam slots, the plates 25 will be raised, and consequently the spikes will be withdrawn from the ground in a vertical plane. This prevents the tearing and uprooting of the turf, and the shoes themselves resting against the turf hold the turf in place. This also functions as means for preventing the tearing and uprooting of the turf.

From the foregoing description, it can be seen that I have provided an exceptionally simple and durable means for penetrating the roots of lawn grass without the tearing thereof to insure the gaining of the proper air and moisture to the roots.

If desired, the inner pairs of pivot ears 20 of the shoes can have formed thereon laterally projecting lugs 32, which are adapted to engage the inner faces of the frame plates 6 and 7, and these lugs prevent the lateral shifting of the endless track on the frame plates.

Changes in details may be made without departing from the spirit or the scope of my invention, but what I claim as new is:—

1. A lawn cultivator comprising, a frame, an endless track mounted upon the frame, including a plurality of pivotally connected shoes, elongated spikes movable through the shoes, means for moving the frame over the ground, and means for forcibly moving the spikes through the shoes incident to the travel of the track over the ground and around the frame for perforating the lawn.

2. A lawn cultivator comprising, a pair of spaced frame plates, an endless track including a plurality of pivotally connected shoes movable around the frame plates, means for moving the frame plates and track over the lawn, operating plates slidably carried by the shoes having a plurality of elongated lawn penetrating spikes movable through the shoes, for perforating the lawn and means for moving the operating plates toward and away from the shoes incident to the movement of the track over the ground and around the frame plates.

3. A lawn cultivator comprising, a pair of spaced frame plates having cam tracks on their inner faces, means rigidly connecting the frame plates in spaced parallel relation, an endless track including a plurality of pivotally connected shoes mounted around the frame plates, means for moving the frame plates and endless track over the ground, operating plates slidably mounted on the shoes, each having a purality of spaced elongated ground penetrating spikes movable through the shoes for perforating the lawn; and cross shafts carried by the operating plates movable in the cam tracks.

4. A lawn cultivator comprising, a pair of spaced frame plates having cam tracks on their inner faces, means rigidly connecting the frame plates in spaced parallel relation, an endless track including a plurality of pivotally connected shoes mounted around the frame plates, means for moving the frame plates and endless track over the ground, operating plates slidably mounted on the shoes, each having a plurality of spaced elongated ground penetrating spikes movable through the shoes for perforating the ground, cross shafts carried by the operating plates movable in the cam tracks, and ears on the shoes engaging the inner faces of the frame plates.

HENRY R. SIEVERKROPP.